(12) United States Patent
Plattner

(10) Patent No.: US 6,672,195 B1
(45) Date of Patent: Jan. 6, 2004

(54) BALLISTIC VENT APPARATUS

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 0 days.

(21) Appl. No.: 10/300,306

(22) Filed: Nov. 20, 2002

(51) Int. Cl.⁷ .............................. F41H 5/26; B64D 7/00
(52) U.S. Cl. ...................................... 89/36.11; 89/36.04
(58) Field of Search ............................ 89/36.01, 36.04, 89/36.11, 36.14; 454/71, 195; 52/198; 244/121

(56) References Cited

U.S. PATENT DOCUMENTS

| | | | | |
|---|---|---|---|---|
| 787,065 A | * | 4/1905 | White | 114/12 |
| 1,035,573 A | * | 8/1912 | Gathmann | 114/10 |
| 1,736,621 A | | 11/1929 | Platt | |
| 1,928,013 A | | 9/1933 | Gander | |
| 2,194,137 A | * | 3/1940 | Copersito | 454/195 |
| 2,376,331 A | | 5/1945 | Abrams | |
| 2,397,809 A | | 4/1946 | Roeder et al. | |
| 3,504,644 A | | 4/1970 | Schibisch | |
| 3,636,895 A | * | 1/1972 | Kelsey | 109/78 |
| 3,749,028 A | * | 7/1973 | Strobl | 109/21.5 |
| 4,186,817 A | | 2/1980 | Bauer | |
| 4,325,283 A | | 4/1982 | Bemiss | |
| 4,325,309 A | * | 4/1982 | King et al. | 109/49.5 |
| 4,726,550 A | | 2/1988 | Chen et al. | |
| 4,957,034 A | * | 9/1990 | Tasdemiroglu | 89/36.02 |
| 5,149,910 A | * | 9/1992 | McKee | 89/36.02 |
| 5,405,673 A | * | 4/1995 | Seibert | 428/137 |
| 5,452,641 A | | 9/1995 | Kariya | |
| 5,641,933 A | | 6/1997 | Kim | |
| 5,753,847 A | | 5/1998 | Middione et al. | |
| 5,780,761 A | | 7/1998 | Musante et al. | |
| 5,880,394 A | | 3/1999 | Kim | |
| 6,405,630 B1 | | 6/2002 | Gonzalez | |

FOREIGN PATENT DOCUMENTS

| | | | | |
|---|---|---|---|---|
| GB | 2058187 A | * | 4/1981 | ............ E06B/5/10 |
| GB | 2275710 A | * | 9/1994 | ............ F24F/13/18 |
| NL | 166540 | * | 3/1981 | ............ F41H/7/04 |

* cited by examiner

Primary Examiner—Michael J. Carone
Assistant Examiner—Troy Chambers
(74) Attorney, Agent, or Firm—Young & Basile, P.C.

(57) ABSTRACT

A ballistic vent apparatus for use in a cockpit door of an aircraft to provide venting and communication between the cockpit and the cabin of an aircraft while preventing bullets and/or splinters from passing through the ballistic vent apparatus. The present invention provides a frame having a U-shaped cross-section adaptable to receive a cross-section of the cockpit door of the aircraft. A pair of opposing and substantially similar supports are connected to the frame, and each of the supports has a plurality of longitudinally spaced slots formed therein in a substantially parallel manner. A plurality of ballistic vent angles extend through the slots of the supports and are connected to the supports. A ballistic panel is connected to the frame and extends along a back side of the ballistic vent angles to prevent bullets and/or splinters from passing through the ballistic vent angles. The entire ballistic vent apparatus is fabricated from a ballistic material such as stainless steel.

21 Claims, 4 Drawing Sheets

BALLISTIC VENT APPARATUS

FIELD OF THE INVENTION

The present invention relates to a ballistic vent apparatus, and more particularly, a ballistic vent apparatus for use in an aircraft to allow for proper ventilation while preventing bullets and splinters from passing therethrough.

BACKGROUND OF THE INVENTION

Airline pilots are susceptible to the hijacking of an aircraft due to the accessibility of the cockpit to the passengers. Different mechanisms and designs have been developed to provide for the safety of pilots by ensuring that the cockpit doors cannot be forced open by an intruder. This requires that the cockpit door be reinforced and locked to protect the pilots from such a break-in. In so doing, ventilation and communication between the cockpit and the cabin are greatly reduced. However, the lack of proper ventilation can affect the proper pressurization of the cockpit and the cabin.

Securement of the cockpit doors does not necessarily protect pilots from gunfire. Terrorists and criminals may still fire guns at a cockpit door or at a bulkhead wall of an aircraft in an attempt to injure the pilots or gain access to the cockpit. Certain designs have been developed that utilize armored walls and doors to protect the pilots from such gunfire, but again, such designs limit the amount of ventilation and communication permitted between the cockpit and the cabin.

Previous ballistic grills and shields have been designed and utilized outside the aircraft industry. These designs have also been constructed to prevent a bullet and or splinters from passing through the ballistic grill or shield. However, such designs are typically complex and/or fabricated from expensive materials thereby creating designs that are difficult to maintain and expensive to manufacture.

It would be desirable to provide a ballistic vent for use in an aircraft that prevented a bullet and/or splinters from passing through the ballistic vent while providing proper ventilation and communication between the cockpit and the cabin of the aircraft. It would also be desirable to provide a ballistic vent design for an aircraft that was simple and inexpensive to manufacture.

SUMMARY OF THE INVENTION

The present invention provides a ballistic vent apparatus for use in an aircraft that provides sufficient ventilation while preventing the passing of bullets and splinters therethrough. The present invention provides a frame having a U-shaped cross-section adaptable to receive a cross-section of a cockpit door or a bulkhead wall of the aircraft. A pair of opposing and similar supports are connected to the frame, and each of the supports have a plurality of longitudinally spaced slots formed therein. A plurality of ballistic vent angles extend through the slots and are connected to the supports. The ballistic vent angles are fabricated from a ballistic material such as stainless steel. The ballistic vent angles have a V-shaped cross-section defined by integrally opposing legs formed at an angle of substantially 105°. A maximum spacing of substantially 0.44 inches is provided between the ballistic vent angles. The integrally opposing legs of the V-shaped cross-section of the ballistic vent angles have ends that are spaced no less than substantially 1.55 inches from one another. Tabs are formed on the longitudinal ends of the ballistic vent angles to secure and position the ballistic vent angles relative to the supports. A ballistic panel may be connected to the frame and extend along the back side of the ballistic vent angles to prevent bullets and splinters from passing through the ballistic vent angles.

BRIEF DESCRIPTION OF THE DRAWINGS

The description herein makes reference to the accompanying drawings wherein like reference numerals refer to like parts throughout several views and wherein.

DESCRIPTION OF THE PREFERRED EMBODIMENT

Figure 1:
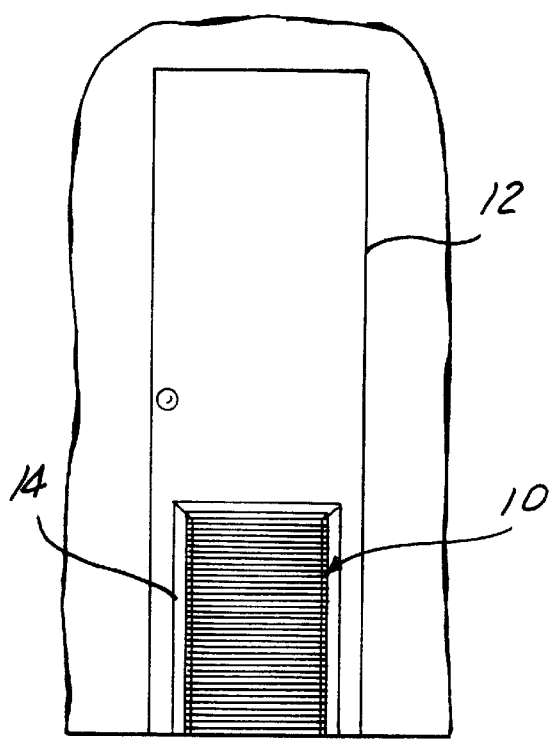
FIG. 1 is a perspective view of a ballistic vent apparatus of the present invention mounted in a cockpit door of an aircraft.
Figure 4:
FIG. 4 is a side view of the ballistic vent apparatus of the present invention.
Figure 3:
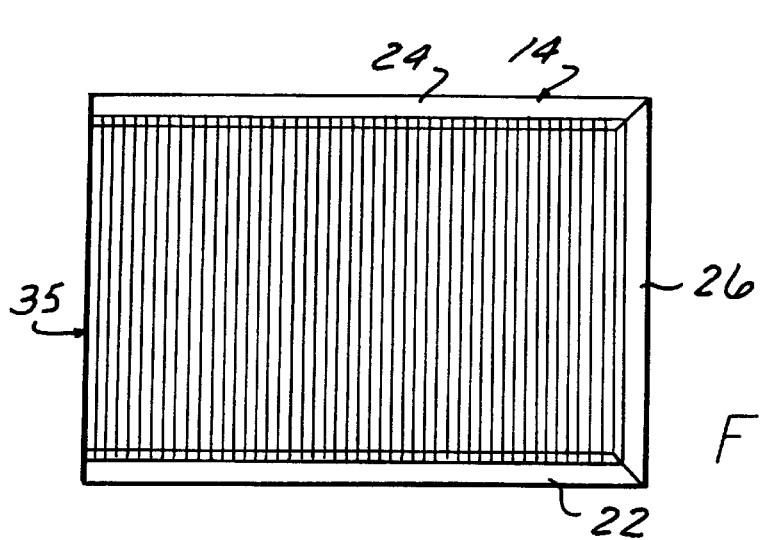
FIG. 3 is a front view of the ballistic vent apparatus of the present invention.
Figure 5:
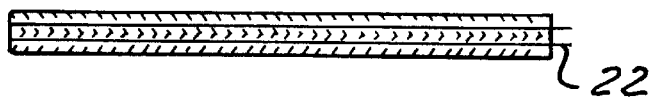
FIG. 5 is a bottom view of the ballistic vent apparatus of the present invention.
Figure 2:
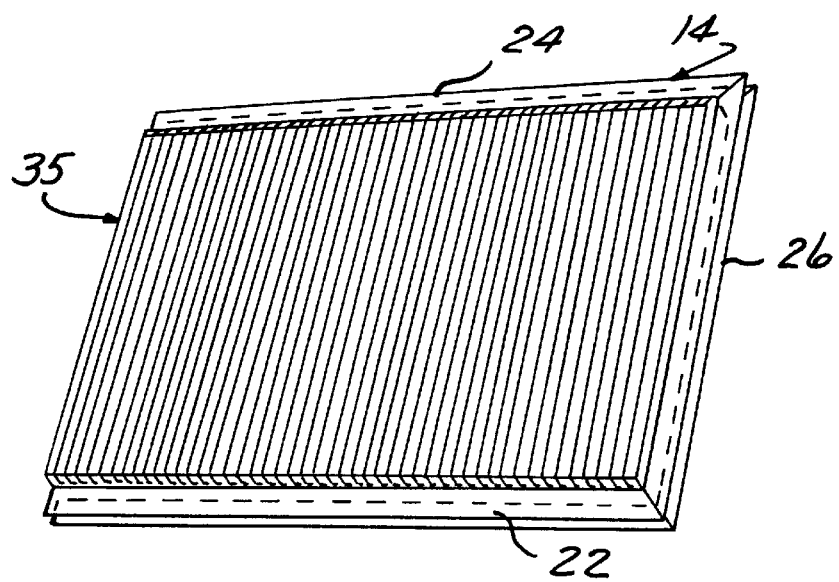
FIG. 2 is a perspective view of the ballistic vent apparatus of the present invention.

Referring to the drawings, the present invention will now be described in detail with reference to the disclosed embodiment.

FIGS. 1–11 illustrate a ballistic vent apparatus 10 of the present invention for use in an aircraft (not shown) to provide sufficient ventilation between the cockpit and the cabin of the aircraft while preventing bullets and/or splinters (not shown) from passing through the ballistic vent apparatus 10. As seen in FIG. 1, the ballistic vent apparatus 10 is shown being utilized in a cockpit door 12 of an aircraft. However, the present invention is not limited to being utilized in the cockpit door 12, but rather, the present invention may be utilized in a bulkhead wall (not shown) of an aircraft or any other structural member that requires ventilation and ballistic protection. The ballistic vent apparatus 10 includes a frame 14 mounted to the cockpit door 12 of the aircraft. As seen in FIGS. 2–6, the frame 14 supports a pair of vertical supports 16, and the vertical supports 16 support a plurality of ballistic vent angles 18. A ballist panel 20 may cover a back side of the ballistic vent apparatus 10 in order to prevent bullets and splinters from passing through the ballistic vent angles 18. The entire ballistic vent apparatus 10 is fabricated from a ballistic material such as 301¼ hard stainless steel.

Figure 7A:
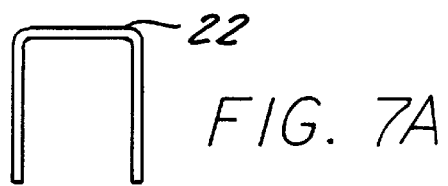
FIG. 7A is a side view of the sides of the frame of the ballistic vent apparatus of the present invention.
Figure 7B:
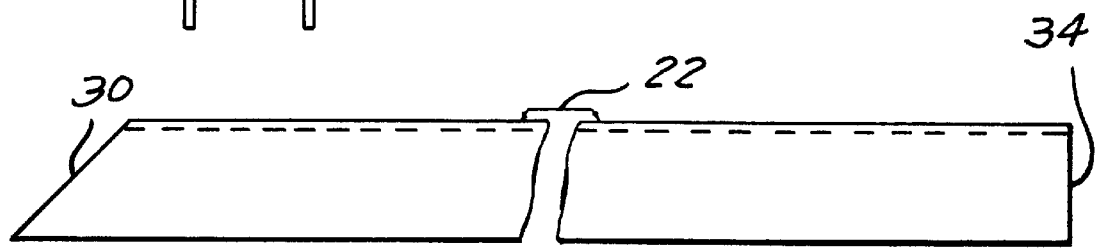
FIG. 7B is a front view of the sides of the frame of the ballistic vent apparatus of the present invention.
Figure 8A:
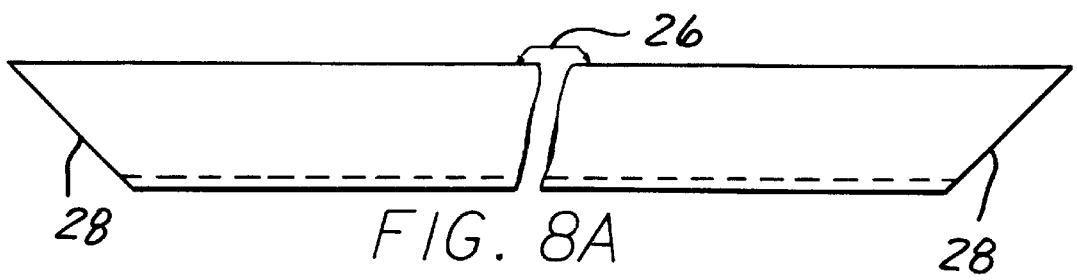
FIG. 8A is a front view of the top of the frame of the ballistic vent apparatus of the present invention.
Figure 8B:
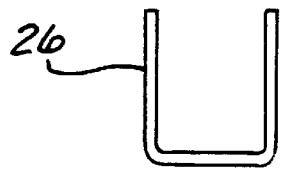
FIG. 8B is a side view of the top of the frame of the ballistic vent apparatus of the present invention.
Figure 6:
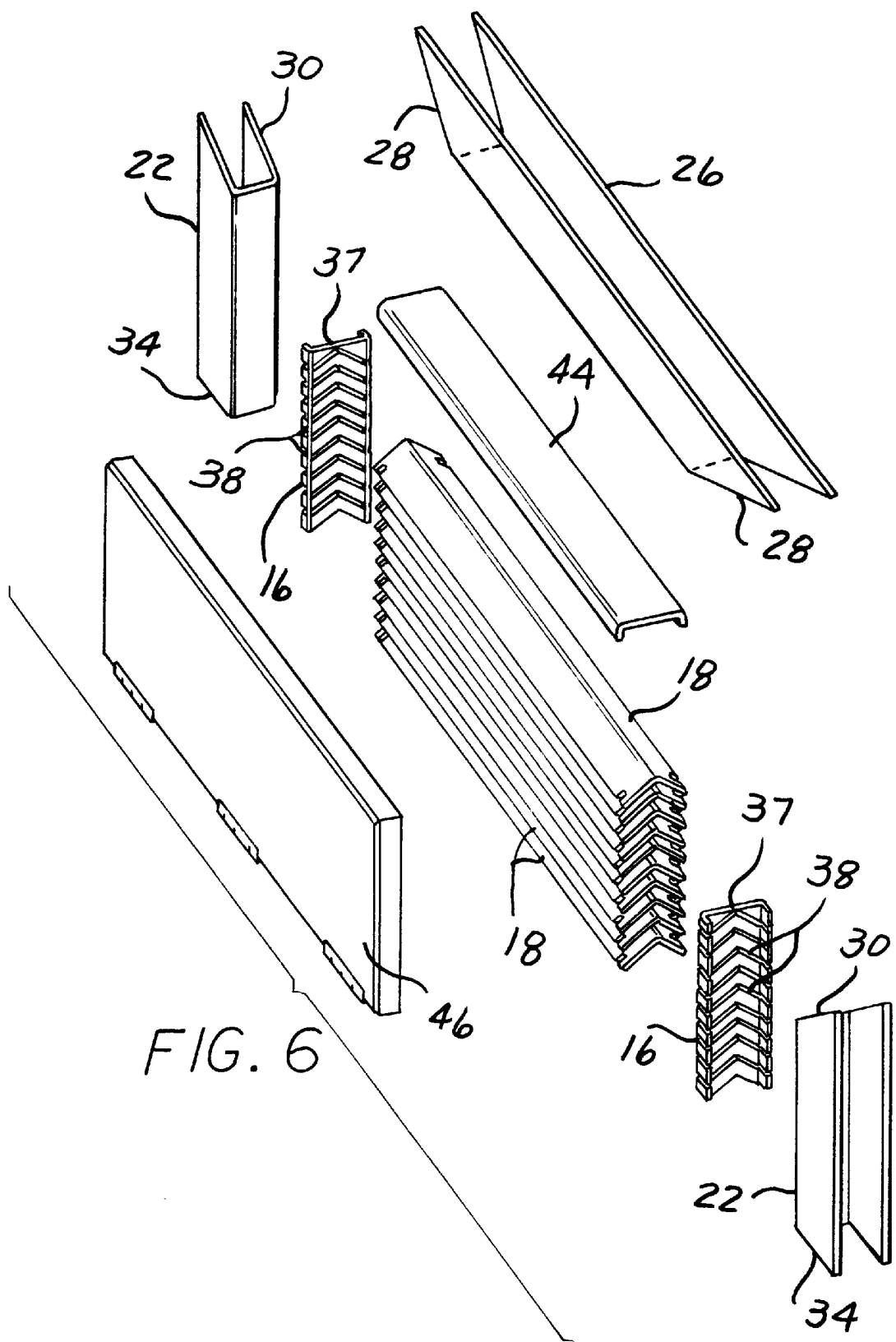
FIG. 6 is a an exploded view of the ballistic vent apparatus of the present invention.

To mount the ballistic vent apparatus 10 in the cockpit door 12 of the aircraft, the frame 14 provides three sides: two opposing sides 22 and a top 26 that extends between the two opposing sides 22. As seen in FIGS. 6–8, each of the sides 22 and the top 26 of the frame 14 have U-shaped cross-sections wherein the open end of the U-shaped cross-section extends outward from the ballistic vent apparatus 10. The top 26 of the frame 14 has opposite longitudinal ends 28 that extend at a substantially 45° angle relative to a longitudinal axis of the top 26 of the frame 14. Likewise, the sides 22 of the frame 14 have a longitudinal end 30 which also extends at a substantially 45° angle relative to a longitudinal axis of the sides 22 of the frame 14. The longitudinal end 30 of the sides 22 complimentarily engage the longitudinal ends 28 of the top 26. The longitudinal end 30 of the sides 22 are welded to the longitudinal ends of the top 26 to form the three-sided frame 14. Opposite longitudinal ends 34 of sides 22 have ends that are substantially perpendicular to the longitudinal axis of the sides 22. The U-shaped cross-section of the frame 14 allows the frame 14 to engage the cockpit door 12 of an aircraft by receiving the width or cross-section of the cockpit door 12 within the U-shaped cross-section thereby securing the ballistic vent apparatus 10 to the cockpit door 12 of the aircraft. The open end 35 of the frame 14 extends to the bottom of the cockpit door 12 of the aircraft.

Figure 10A:
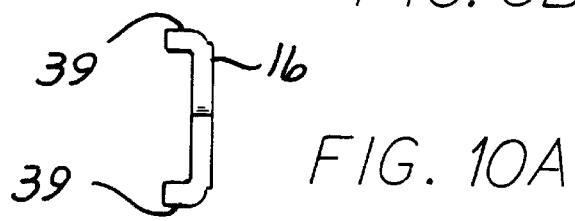
FIG. 10A is a side view of the vertical supports of the ballistic vent apparatus of the present invention.
Figure 10B:
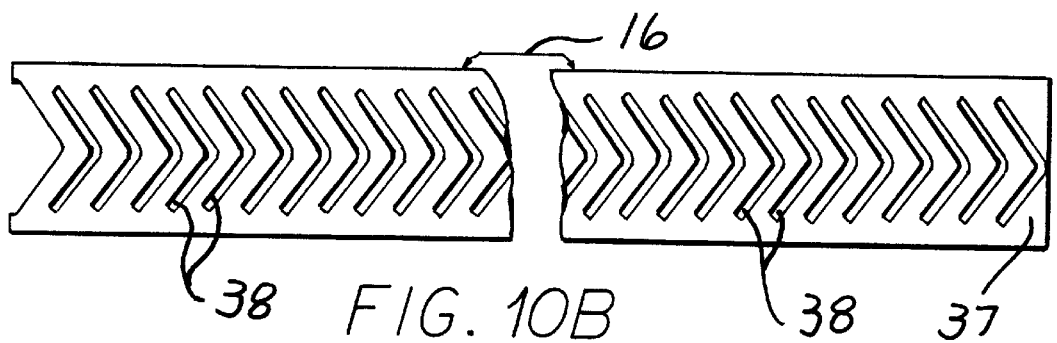
FIG. 10B is a front view of the vertical supports of the ballistic vent apparatus of the present invention.

In order to support the ballistic vent angles 18 within the frame 14, the vertical supports 16 are positioned adjacent the sides 22 of the frame 14. As seen in FIGS. 6 and 10, the vertical supports 16 are fabricated from a substantially flat panel 37 having turned-up sides 39 to form a substantially U-shaped cross-section. A plurality of V-shaped slots 38 are formed in and extend through the vertical supports 16. The V-shaped slots 38 are evenly spaced along a longitudinal axis of the vertical supports 16 and remain substantially parallel with respect to one another. The V-shaped slots 38 extend between the turned-up sides 39 of the vertical supports 16 in order to receive the ballistic vent angles 18. Since the V-shaped slots 38 of the vertical supports 16 determine the position of the ballistic vent angles 18, the V-shaped slots 38 are spaced no more than 0.44 inches apart from one another. This ensures that a bullet and/or splinters will not pass through the ballistic vent angles 18.

Figure 11A:
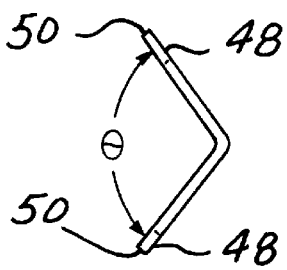
FIG. 11A is a side view of the ballistic angles of the ballistic vent apparatus of the present invention.
Figure 11B:
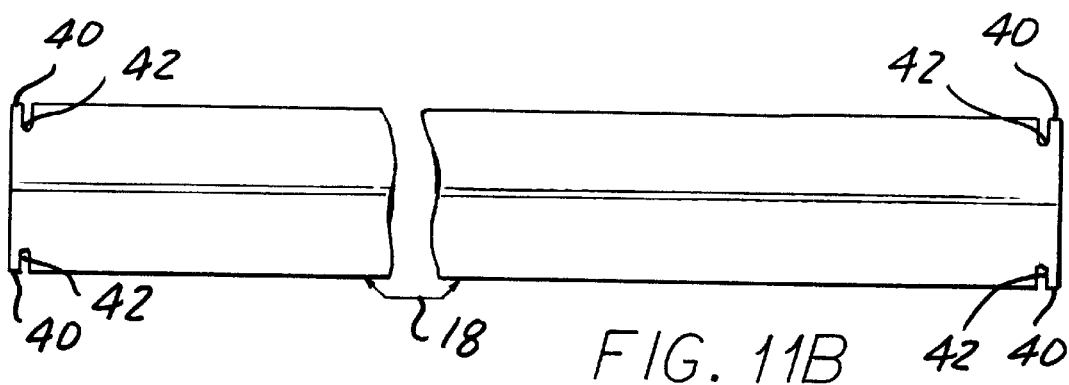
FIG. 11B is a front view of the ballistic angles of the ballistic vent apparatus of the present invention.

To allow for proper ventilation between the cockpit and the cabin of the aircraft while preventing any bullets and/or splinters from passing through the ballistic vent apparatus 10, the ballistic vent angles 18 are equally spaced and substantially parallel as defined by the V-shaped slots 38 of the vertical supports 16. As seen in FIGS. 6 and 11, each ballistic vent angle 18 has a V-shaped cross-section defined by integral, opposing legs 48 that extend from one another at an angle θ of substantially 105°. For the ballistic vent apparatus 10 to function properly, the opposing legs 48 of the ballistic vent angles 18 must extend at angle θ between 105°–90°. In addition, the spacing between ends 50 of the legs 48 of the V-shaped cross-section of the ballistic vent angles 18 must be no less than substantially 1.55 inches apart. The ballistic vent angles 18 also have a pair of tabs 40 integrally formed at opposite longitudinal ends of the ballistic vent angles 18. The tabs 40 are formed by open-ended slots 42 which extend from each side of the ballistic vent angles 18 at substantially right angles to a longitudinal axis of the ballistic vent angles 18. When the ballistic vent angles 18 are inserted through the V-shaped slots 38 of the vertical supports 16, the tabs 40 are bent downward to secure and position the ballistic vent angles 18 relative to the supports 16. The vertical supports 16 are spot-welded to the longitudinal ends of the ballistic vent angles 18 at the point at which the slots 42 are formed into the ballistic vent angles 18. The spot welding of the ballistic vent angles 18 to the supports 16 at the designated positions provides a certain level of rigidity that enhances the ballistic qualities of the ballistic vent apparatus 10.

Figure 9A:
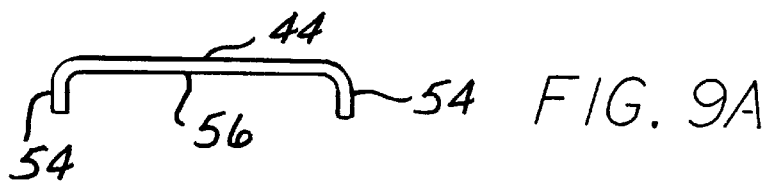
FIG. 9A is a side view of a vent cover of the ballistic vent apparatus of the present invention.
Figure 9B:
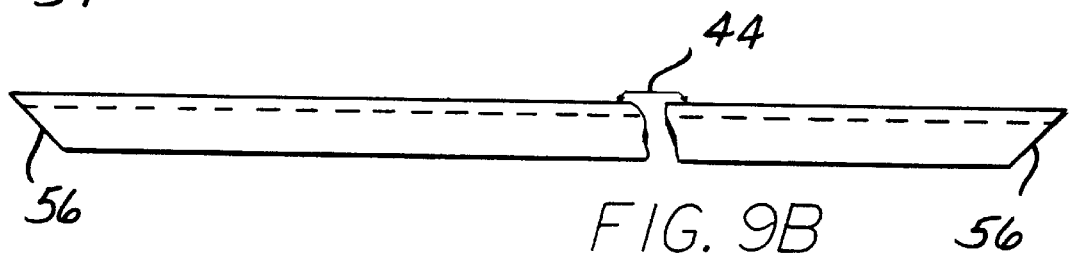
FIG. 9B is a front view of a vent cover of the ballistic vent apparatus of the present invention.

To secure the top 26 of the frame 14 to the top ballistic vent angle 18, a vent cover 44 is mounted adjacent the top ballistic vent angle 18. As seen in FIGS. 6 and 9, the vent cover 44 is a substantially flat panel 52 having turned-down sides 54 to form a substantially U-shaped cross-section. The longitudinal ends 56 of the vent cover 44 are formed at substantially 45° angles relative to a longitudinal axis of the vent cover 44 in order to cooperatively engage the sides 22 of the frame 14. The vent cover 44 provides a substantially flat surface 52 by which the bottom 26 of the frame 14 can be connected thereto, such as by welding. Since the frame 14 is narrower than the vertical supports 16 and the vent cover 44, the frame 14 may be welded to the vertical supports 16 and the vent cover 44 in a position that is desirous of where the ballistic vent apparatus 10 is to be positioned relative to the cockpit door 12. Thus, if it is desirous of having the ballistic vent angles 18 extend outward toward the cabin as opposed to the cockpit 12, then the frame 14 may be welded toward the cockpit side of the vertical supports 16. If it is desirous of having the ballistic vent angles 18 centered with respect to the cockpit door, then the frame 14 may be welded in the center of the vertical supports 16.

As an added level of protection to the ballistic vent apparatus 10, a ballistic panel 46 may be connected to the frame 14 of the ballistic vent apparatus 10 or to the cockpit door 12 of the aircraft. The ballistic panel 46 may be connected by threaded fasteners or rivets, or the ballistic panel 46 may be hingedly connected to the frame 14 or the cockpit door 12 of the aircraft. The ballistic panel 46 has a shallow, substantially rectangular box-like shape that covers the back side of the ballistic vent angles 18 to deflect any bullets and/or splinters that may pass through the ballistic vent angles 18.

In operation, the ballistic vent apparatus 10 is mounted within a cockpit door 12 of an aircraft. The ballistic vent apparatus 10 is mounted such that the ballistic vent angles 18 point downward. That is, the midpoint of the V-shaped cross-section of the ballistic vent angles 18 extends upward while the ends 50 of the opposing legs 48 of the V-shaped cross-section of the ballistic vent angles 18 point downward. If a bullet is fired at the ballistic vent apparatus 10, the bullet hits and is deflected off the ballistic vent angles 18 and is prevented from passing through the ballistic vent angles 18. If a deflected bullet and/or splinters pass through the ballistic vent angles 18 the bullet and/or splinters will hit the ballistic panel 46 and be prevented from further travel.

While the invention has been described in connection with what is presently considered to be the most practical and preferred embodiment, it is to be understood that the invention is not to be limited to those disclosed embodiments, but, to the contrary, it is intended to cover various modifications and equivalent arrangements included with in the spirit and scope of the appended claims which scope is intended to be accorded the broadest interpretation so as to encompass all such modifications and equivalent structures as is permitted under the law.

What is claimed is:

1. A ballistic vent apparatus for use in an aircraft, comprising:
   a frame;
   a pair of opposing and substantially similar supports connected to said frame, and each of said supports having a plurality of longitudinally spaced slots formed therein; and
   a plurality of ballistic vent angles extending through said slots and connected to said supports, and said ballistic vent angles fabricated from a ballistic material to prevent the passing of bullets and splinters through said ballistic vent angles.

2. The ballistic vent apparatus stated in claim 1, further comprising:
   said frame having a U-shaped cross section adaptable to receive a cross-section of a cockpit door of said aircraft.

3. The ballistic vent apparatus stated in claim 1, further comprising:
   said supports having a substantially U-shaped cross section, and said slots in said supports evenly spaced and substantially parallel to one another.

4. The ballistic vent apparatus stated in claim 1, further comprising:
   said ballistic vent angles fabricated from stainless steel.

5. The ballistic vent apparatus stated in claim 1, further comprising:
   said ballistic vent angles having a V-shaped cross-section defined by integrally opposing legs formed at an angle of substantially 105°.

6. The ballistic vent apparatus stated in claim 1, further comprising:
   said ballistic vent angles having a maximum spacing of substantially 0.44 inches between one another.

7. The ballistic vent apparatus stated in claim 1, further comprising:
   said ballistic vent angles having a V-shaped cross-section defined by integrally opposing legs having ends that are spaced no less than substantially 1.55 inches from one another.

8. The ballistic vent apparatus stated in claim 1, further comprising:
   said ballistic vent angles having longitudinal ends with tabs formed thereon to secure and position said ballistic vent angles to said supports.

9. The ballistic vent apparatus stated in claim 1, further comprising:
   a ballistic panel connected to said frame and extending along a back side of said ballistic vent angles to prevent bullets and splinters from passing through said ballistic vent angles.

10. A ballistic vent apparatus for use in an aircraft, comprising:
    a frame having a U-shaped cross-section adaptable to receive a cross-section of a cockpit door of said aircraft;
    a pair of similar and substantially parallel supports connected to said frame and having a plurality of V-shaped slots extending therethrough wherein said V-shaped slots are longitudinally spaced and parallel with respect to one another; and
    a plurality of ballistic vent angles having a V-shaped cross-section extending through said slots and connected to said supports to form a plurality of substantially parallel ballistic vent angles wherein said ballistic vent angles are fabricated from a ballistic material to prevent the passing of bullets and splinters through said ballistic vent angles.

11. The ballistic vent apparatus stated in claim 10, further comprising:
    said ballistic vent angles fabricated from stainless steel.

12. The ballistic vent apparatus stated in claim 10, further comprising:
    said ballistic vent angles having a V-shaped cross-section defined by integrally opposing legs formed at an angle of substantially 105°.

13. The ballistic vent apparatus stated in claim 10, further comprising:
    said ballistic vent angles having a maximum spacing of substantially 0.44 inches between one another.

14. The ballistic vent apparatus stated in claim 10, further comprising:
    said ballistic vent angles having a V-shaped cross-section defined by integrally opposing legs having ends that are spaced no less than substantially 1.55 inches apart from one another.

15. The ballistic vent apparatus stated in claim 10, further comprising:
    said ballistic vent angles having longitudinal ends with tabs formed thereon, and said tabs extending at a substantially 90° angle with respect to said longitudinal ends of said ballistic vent angles to secure and position said ballistic vent angles to said supports.

16. The ballistic vent apparatus stated in claim 10, further comprising:
    a ballistic panel connected to said frame and extending along a back side of said ballistic vent angles to prevent any bullets or splinters from passing through said ballistic vent angles.

17. A ballistic vent apparatus for use in an aircraft, comprising:
    a frame having opposing, substantially parallel sides and a bottom extending between said opposing sides at a substantially right angle, and said frame having a substantially U-shaped cross-section adaptable to receive a cross-section of a cockpit door of said aircraft;
    a pair of similar, substantially parallel supports having U-shaped cross-sections and connected to said opposing sides of said frame and having a plurality of V-shaped slots formed therein, longitudinally spaced, and substantially parallel with respect to one another;
    a plurality of stainless steel ballistic vent angles having a V-shaped cross-section extending through said slots in said opposing supports to form a plurality of substantially parallel ballistic vent angles to prevent the passing of bullets and splinters through said ballistic vent angles; and
    a pair of opposing and integral tabs formed on longitudinal ends of said ballistic vent angles to properly position said ballistic vent angles to said supports wherein said ballistic vent angles are welded to said supports adjacent said tabs.

18. The ballistic vent apparatus stated in claim 17, further comprising:
    said V-shaped cross-section of said ballistic vent angles defined by integral opposing legs formed at an angle of substantially 105°.

19. The ballistic vent apparatus stated in claim 17, further comprising:

said ballistic vent angles having a maximum space of substantially 0.44 inches between one another.

20. The ballistic vent apparatus stated in claim 17, further comprising:

said V-shaped cross-section of said ballistic vent angles defined by integral opposing legs having ends spaced no less than substantially 1.55 inches apart from one another.

21. The ballistic vent apparatus stated in claim 17, further comprising:

a ballistic panel connected to said frame and extending along a back side of said ballistic vent angles to prevent bullet and splinters from passing through said ballistic vent angles.

* * * * *

UNITED STATES PATENT AND TRADEMARK OFFICE
CERTIFICATE OF CORRECTION

PATENT NO. : 6,672,195 B1
DATED : January 6, 2004
INVENTOR(S) : Plattner

It is certified that error appears in the above-identified patent and that said Letters Patent is hereby corrected as shown below:

<u>Column 3,</u>
Line 1, please delete "ballist" and insert -- ballistic --; and
Line 2, please delete "20" and insert -- 46 --.

Signed and Sealed this

Sixteenth Day of March, 2004

JON W. DUDAS
*Acting Director of the United States Patent and Trademark Office*